(12) United States Patent
Umashankar et al.

(10) Patent No.: US 10,938,281 B2
(45) Date of Patent: Mar. 2, 2021

(54) TERMINAL CONNECTION OF ROTARY ELECTROMAGNETIC DEVICE

(71) Applicant: INDIA NIPPON ELECTRICALS LIMITED, Tamil Nadu Hosur (IN)

(72) Inventors: Raman Umashankar, Tamil Nadu Hosur (IN); Sivasubramanian Ravi Kumar, Tamil Nadu Hosur (IN); Murugan Sundar, Tamil Nadu Hosur (IN)

(73) Assignee: INDIA NIPPON ELECTRICALS LIMITED, Hosur (IN)

( * ) Notice: Subject to any disclaimer, the term of this patent is extended or adjusted under 35 U.S.C. 154(b) by 155 days.

(21) Appl. No.: 16/094,040

(22) PCT Filed: Apr. 19, 2017

(86) PCT No.: PCT/IN2017/050141
§ 371 (c)(1),
(2) Date: Oct. 16, 2018

(87) PCT Pub. No.: WO2017/183046
PCT Pub. Date: Oct. 26, 2017

(65) Prior Publication Data
US 2019/0131854 A1 May 2, 2019

(30) Foreign Application Priority Data
Apr. 19, 2016 (IN) .............................. 201641013688

(51) Int. Cl.
*H02K 15/00* (2006.01)
*H02K 3/52* (2006.01)
(Continued)

(52) U.S. Cl.
CPC ......... *H02K 15/0068* (2013.01); *H01R 4/029* (2013.01); *H01R 4/625* (2013.01);
(Continued)

(58) Field of Classification Search
CPC ...... H02K 15/0068; H02K 3/522; H02K 3/02; H01R 4/625; H01R 43/0207; H01R 4/029; H01R 4/62
See application file for complete search history.

(56) References Cited

U.S. PATENT DOCUMENTS 5,671,607 A 9/1997 Clemens et al.
7,327,063 B2 * 2/2008 Matsubara ............... H02K 3/02
310/184
(Continued)

FOREIGN PATENT DOCUMENTS

CN 101202473 6/2008
JP 2009009736 A * 1/2009

OTHER PUBLICATIONS

International Patent Application No. PCT/IN2017/050141, International Search Report Written Opinion dated Sep. 4, 2017.
(Continued)

*Primary Examiner* — Jeremy A Luks
(74) *Attorney, Agent, or Firm* — Leber IP Law; David C. Robertson

(57) ABSTRACT

A terminal connection of a rotary electromagnetic device and a method of connecting a terminal to an aluminum stator wire of the rotary electromagnetic device without changing stator configuration is described. A de-insulated portion at one of ends of the stator wire is connected to a small connection wire made of copper by ultrasonic welding to form a mutually welded stator wire and connection wire portion. The mutually welded stator wire and connection wire portion are soldered to the terminal to, therefore, form an electric connection between the stator wire and the terminal.

9 Claims, 4 Drawing Sheets

(51) Int. Cl.
    *H01R 4/62*       (2006.01)
    *H01R 43/02*     (2006.01)
    *H02K 3/02*       (2006.01)
    *H01R 4/02*       (2006.01)

(52) U.S. Cl.
    CPC ......... *H01R 43/0207* (2013.01); *H02K 3/522* (2013.01); *H02K 3/02* (2013.01)

(56) References Cited

U.S. PATENT DOCUMENTS

| | | |
|---|---|---|
| 8,450,901 B2 | 5/2013 | Jung et al. |
| 8,627,996 B2 | 1/2014 | Patrikios |
| 10,056,727 B2 * | 8/2018 | Jesenko ................. H01R 39/32 |
| 10,389,215 B2 * | 8/2019 | Yabe ....................... H02K 3/345 |
| 2012/0000693 A1 | 1/2012 | Yoon et al. |
| 2015/0318768 A1 * | 11/2015 | Schlegel ................ H01R 39/32 |
| | | 310/234 |

OTHER PUBLICATIONS

European Patent Application No. 17731309.5, Office Action dated Apr. 23, 2020, 5 pages.
Indian Patent Application No. 201641013688 Examination Report dated Jul. 15, 2020, 5 pages.

\* cited by examiner

TERMINAL CONNECTION OF ROTARY ELECTROMAGNETIC DEVICE

RELATED APPLICATIONS

This application is a national phase entry of International Patent Application No. PCT/IN2017/050141, filed Apr. 19, 2017, which claims priority from Indian Patent Application No. 201641013688, filed on Apr. 19, 2016, the entire disclosures of which are incorporated herein by reference.

TECHNICAL FIELD

The present subject matter relates, in general, to rotary electromagnetic devices, and particularly a method of connecting the stator wire made of aluminum and the terminal by without changing the stator configuration.

BACKGROUND

Rotary electromagnetic devices in form of electrical motors and electricity generators are vastly employed in diverse fields for performing a variety of functions. For example, in automobiles, the rotary electromagnetic devices may find application in the form of generators for powering various electric appliances like lights, air conditioners, and charging batteries, or as motors for operations like starting an engine and running air blowers.

The rotary electromagnetic devices may be electrically connected to various electrical devices through an electrical terminal made of electrically conducting material. For example, one side of the electrical terminal may connect to a stator wire of the rotary electromagnetic device, while another end of the electrical terminal may connect to the electrical devices. Generally, the stator wire of the rotary electromagnetic devices is made of copper. Thus, the connection of the wires with the electromagnetic device is to be established through a terminal.

BRIEF DESCRIPTION OF DRAWING

The features, aspects, and advantages of the subject matter will be better understood with regard to the following description, and accompanying figures. The use of the same reference number in different figures indicates similar or identical features and components.

DETAILED DESCRIPTION

Figure 1:
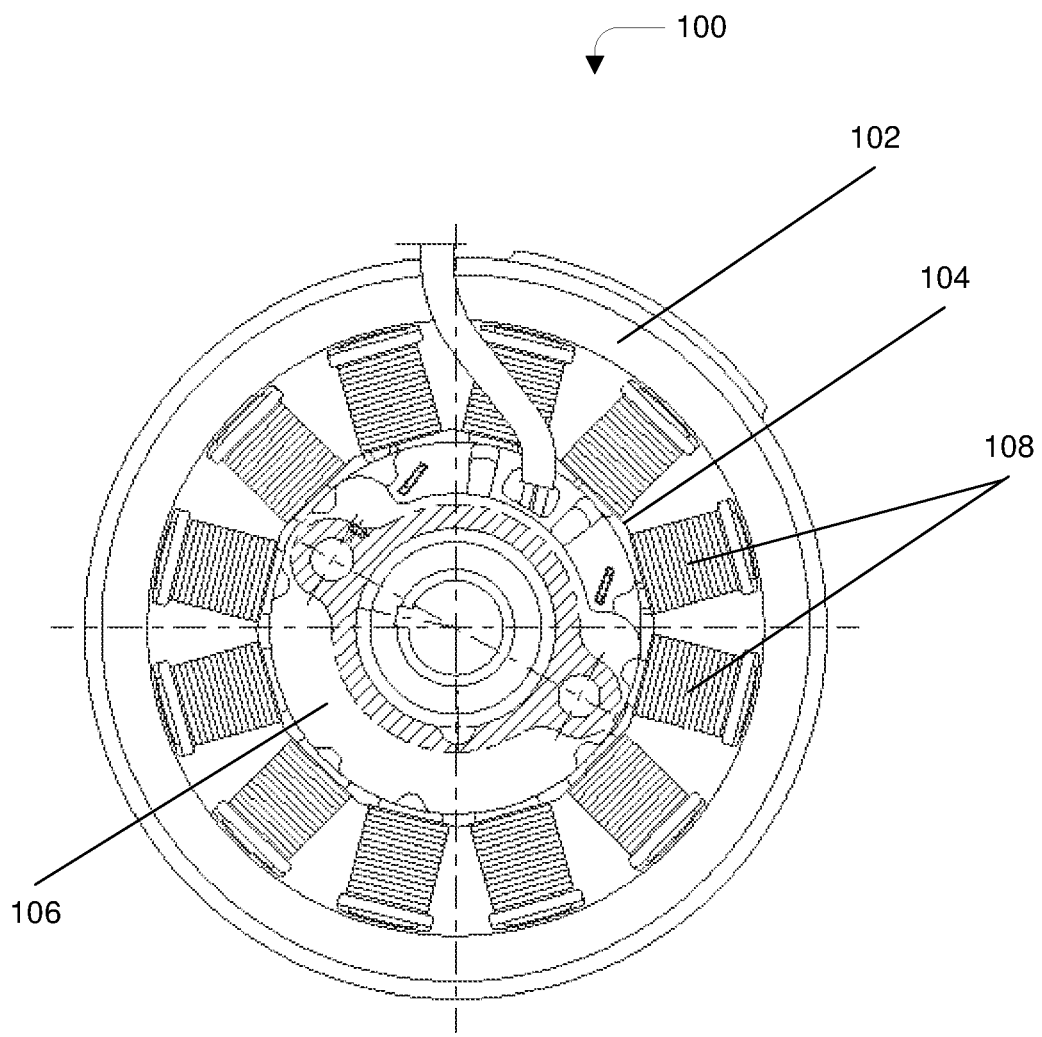
FIG. 1 illustrates a perspective view of a rotary electromagnetic device, in accordance with an implementation of the present subject matter

The present subject matter relates to rotary electromagnetic devices. The rotary electromagnetic devices generally work based on interaction of an electric field and a magnetic field. The rotary electromagnetic devices may be implemented either as motors that use electricity to produce a mechanical rotary motion, or as generators that convert mechanical energy into electricity.

The rotary electromagnetic devices find application in various fields. One such field of application is automobiles, in which a rotary electromagnetic device is implemented as an alternating current (AC) generator, hereinafter referred to as AC generator, to generate electricity for powering electric devices like lights, heater, and sound systems. For powering such electric devices, an electric connection between the AC generator and the electric devices may be established using electricity conducting wires. The electricity conducting wires may be connected to the electric devices from one side, and to the AC generator from other side.

The electricity conducting wires are connected to the AC generator through an electric terminal, hereinafter referred to as terminal. The terminal may be made of any material selected from copper, Phosphor bronze, and bronze. For establishing connection through the terminal, one end of the terminal is connected to the electricity conducting wires and another end of terminal is connected to a stator wire of the AC generator.

The AC generator generally includes a rotor and a stator with the rotor being configured to rotate with respect to the stator. The rotor may be configured to act as magnet, thereby producing a magnetic field. The stator may include a stator core and stator wire in the form of windings. The stator core may be made of iron laminates, while the stator wire may be made of copper. Copper is a valuable non-ferrous metal, which results increase in material costs. To overcome the disadvantages associated with copper, the stator wires are nowadays made from aluminum, as aluminum provides advantage of being light weight and lesser expensive as compared to copper.

However, in case of the stator wire being made of aluminum, conventionally known methods of connection, for example, crimping (the terminal on to the stator wire), welding, and soldering, may not be effective to connect the stator wire being made of aluminum with the terminal. For example, connection through crimping is not a preferred method as crimping does not produce a strong connection, and is prone to loosening and breaking, over time. Moreover, as the connectivity strength off aluminum is lower as compared to copper, connection of the stator wire made of aluminum to the terminal through soldering or welding is difficult to achieve.

Various embodiments and implementations described herein, in accordance with the present subject matter, include a method and a rotary electromagnetic device to conveniently connect a stator wire made of aluminum and a terminal through soldering by without changing the stator configuration.

In an implementation, the rotary electromagnetic device includes a rotor and a stator. The stator includes a stator core and a stator wire made of aluminum. In an example, the stator wire is wound on the stator core and is insulated. Without changing configuration of the stator, the stator wire is connected to a small length of connection wire, for example, made of copper. In an example, the stator wire is connected to the connection wire using ultrasonic welding to form a mutually welded stator wire and connection wire portion. The mutually welded stator wire and connection wire portion may then be soldered to the terminal with ease.

Accordingly, as compared to the conventionally known methods of connection, the present subject matter provides a simple method of connecting the stator wire made of aluminum and the terminal without changing the stator configuration. Also, the implementation of the present subject matter provides a low cost method of connection and is capable of achieving high manufacture efficiency.

The above mentioned implementations are further described herein with reference to the accompanying figures. It should be noted that the description and figures relate to exemplary implementations, and should not be construed as a limitation to the present subject matter. It is also to be understood that various arrangements may be devised that, although not explicitly described or shown herein, embody the principles of the present subject matter. Moreover, all statements herein reciting principles, aspects, and embodiments of the present subject matter, as well as specific examples, are intended to encompass equivalents thereof.

FIG. 1 illustrates an alternating current (AC) generator 100 as per an implementation of the present subject matter. The working of the AC generator 100 is based on Faradays' law, according to which when an electrical conductor rotates in a magnetic field, an electric current is induced in the conductor.

Further, the AC generator 100 includes a rotor 102 and a stator 104. In the AC generator 100, the magnetic field may be developed by rotating at least one magnet implemented in the rotor 102. In an example, the rotor 102 includes at least one magnet disposed along a circumferential periphery of the AC generator 100. The at least one magnet may either be a permanent magnet or an electromagnet. In said example, the at least one magnet may either be permanent magnet(s) or temporary electromagnet(s). In another example, the rotor 102 includes a plurality of permanent magnets disposed along the outer circumferential peripheral side of the AC generator 100. Each of the plurality of permanent magnets is disposed in a polarity opposite to each of two adjacent magnets.

The AC generator 100 further includes a rotary shaft (not shown in the figure) that is mounted on the rotor 102. The rotor 102 is configured to be rotated by an external source of power like an engine of an automobile, through the rotary shaft. The magnet of the rotor produces a magnetic field and upon rotation of the rotor, a rotating magnetic field is generated.

Further, in an assembly of the AC generator 100, the rotor 102 may be configured to rotate inside the AC generator 100. Thus, during operation of the AC generator 100, the rotor 102 rotates inside the stator 104, as a result of which an alternating current is induced in a stator wire of the stator 104.

Yet further, as can be seen from FIG. 1, the stator 104 is represented by an electrical conductor as an assembly of a stator core 106 and stator wire (302) in the form of windings. The stator core 106 may be made of iron laminates, while the stator wire (302) may be made of copper or aluminum or any other electrically conducting material.

In an example, the stator 104 is positioned on an inner circumferential peripheral side of the AC generator 100 such that the outer peripheral side of the stator 104 faces the inner peripheral side of the rotor 102. In an example, the stator 104 is constituted of a hollow cylindrical stator core 106 having slots extending in the circumferential direction upon which a stator wire is wounded to form wire windings 108.

In an implementation of the present subject matter, the stator wire is made of aluminum, while conventionally the stator wire was made from copper. The stator wire may be woven around the slots provided on the stator core 106 to form the wire windings 108. The number of slots on the stator core 106 is selected depending upon the requirement of desired weight, cost and operating characteristics of the AC generator. The stator core 106 may be made of laminates stacked against each other. The laminates may be made of materials like iron, aluminum and steel. The stator wire is an electricity conducting wire and may be made of materials like copper and aluminum. Further, the stator wire is electrically insulated by coating with a layer of electrically non-conductive material, like resin, Polyvinyl chloride and Polytetrafluoroethylene.

During operation of the AC generator 100, the rotor 102 is rotated using external source of power. The rotor 102 forms a plurality of magnetic poles with the same poles arranged alternately along the circumferential direction. The number of magnetic poles of the rotor 102 may be chosen as per requirement. As the rotor 102 rotates, a rotating magnetic field is produced with magnetic lines running across the stator 104. As a result, an electromotive force (EMF) is generated in the stator wire. EMF is a voltage that is generated across an electric conductor when the conductor is exposed to a rotating magnetic field. This voltage generated across the stator wire causes a current to flow through the stator wire. The direction of the current generated in the stator wire, may be determined using the Fleming's Right hand rule.

The alternating current generated in the AC generator 100 may then be supplied to electrical devices by connecting the stator wire to the electrical devices through an electricity conducting wire (not shown in the figure), and the electricity conducting wire may be connected to the AC generator through an electrical terminal. The terminal is tin plated, made of one of but not limited to materials selected from copper, phosphor bronze, and bronze.

The terminal may be connected with the stator wire made of aluminum by various known connection methods like crimping the terminal on to the stator wire, welding, and soldering. A relatively convenient connection method is soldering. Soldering involves joining metal pieces by insertion of a filler material, known as solder material, between the metal pieces to be joined. The solder material is made of an electrically conducting metal alloy having melting point lower than the metal pieces to be joined. The solder material is deposited in the molten state between the metal pieces to be joined and allowed to solidify, thereby establishing an electrical connection between the two metal pieces. However, soldering an aluminum part poses difficulty, and has to be done only by using special solder and an extremely aggressive flux. The usage of such extremely aggressive flux soldering may be hazardous to human health.

The present subject matter provides for a connection of two metal pieces when one of the metal pieces is aluminum and other is copper by using ultrasonic welding.

Figure 2:
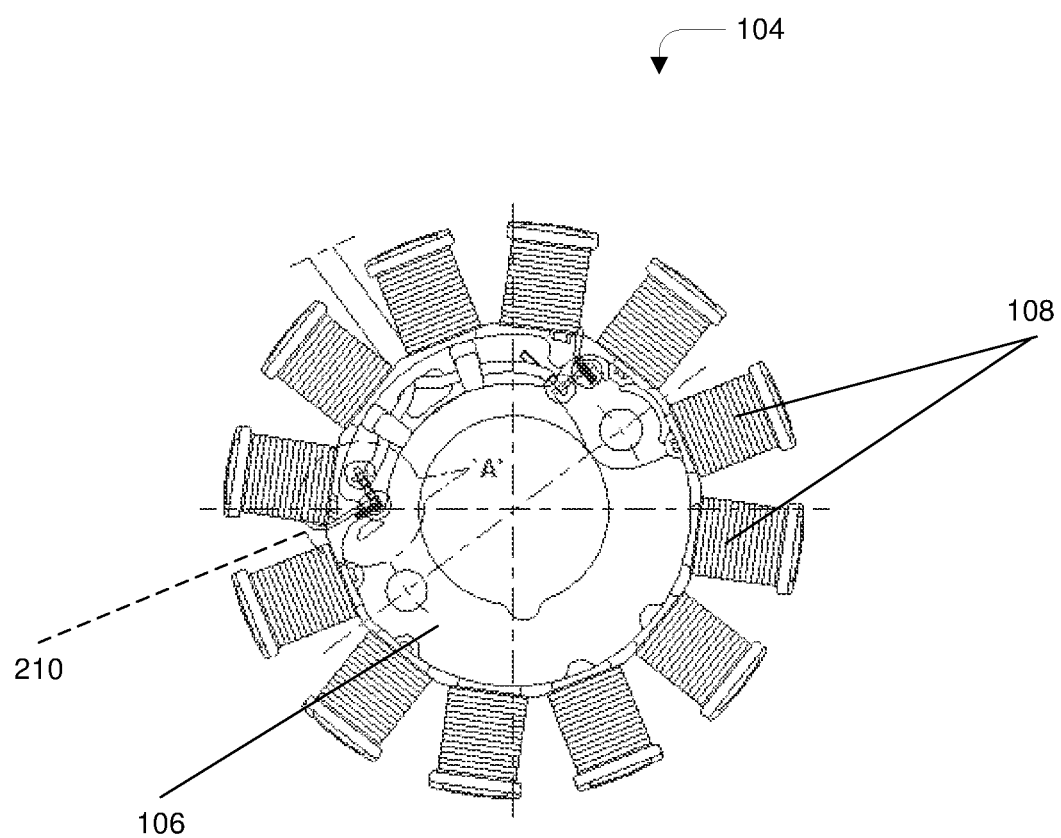
FIG. 2 illustrates a perspective view of a stator assembly of the rotary electromagnetic device including a terminal connection portion, in accordance with an implementation of the present subject matter.

As per an implementation of the present subject matter, without changing the stator configuration, the stator wire being made of aluminum, is connected to a connection wire, for example, made of copper. In an example, the stator wire 302 is connected to the connection wire using ultrasonic welding to form a mutually welded stator wire and connection wire portion 210, as can be seen from FIG. 2. The mutually welded stator wire and connection wire portion 210 may then be soldered to the terminal. The mutually welded stator wire and connection wire portion 210 may be interchangeably referred to as connection portion 210 in the description hereinafter for the sake of brevity.

Figure 3:
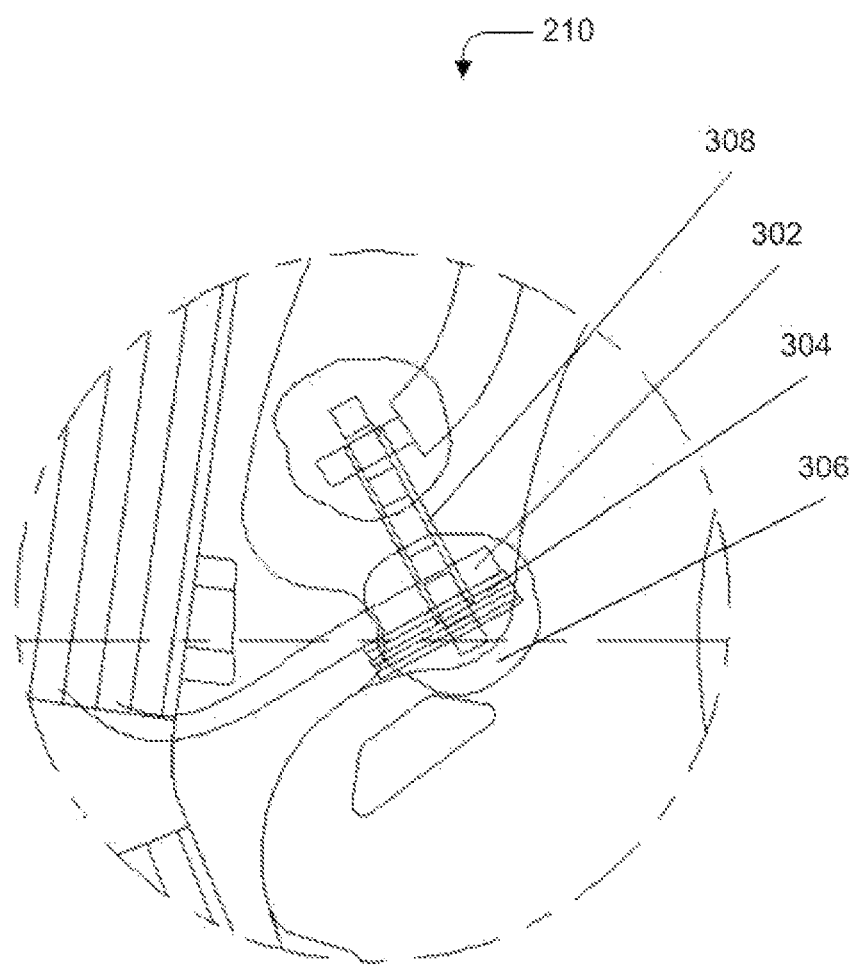
FIG. 3 illustrates a magnified view of the terminal connection portion of the rotary electromagnetic device, in accordance with an implementation of the present subject matter.

FIG. 3 illustrates a magnified view of the connection portion 210 of a stator wire 302 and a terminal 308, in accordance with an implementation of the present subject matter. As can be seen in FIG. 3, a connection wire 304 is connected to the stator wire 302 without changing the configuration of the stator 104. In an example, the connection wire 304 is a small price of wire made of copper. As the stator wire 302 is generally insulated, the stator wire 302 is connected to the connection wire 304 after removing the insulation coating. The insulation coating may be removed by any of the conventionally known methods to from a de-insulated portion. In the present example, the insulation coating is removed by scraping off the insulation of the stator wire 302.

Once the insulation is removed, the stator wire 302 is connected to the connection wire 304 through any of the conventionally known methods. In an implementation, a de-insulated portion along an end of the connection wire 304 is connected to the stator wire 302 through ultrasonic welding to form a mutually welded stator wire and connection wire portion 210. The mutually welded stator wire and connection wire portion 210 are further connected to a terminal 308. In an example, the mutually welded stator wire and connection wire portion 210 are connected to the terminal 308 by soldering to therefore, form an electrical connection between the stator wire 302 and the terminal 308.

Figure 4:
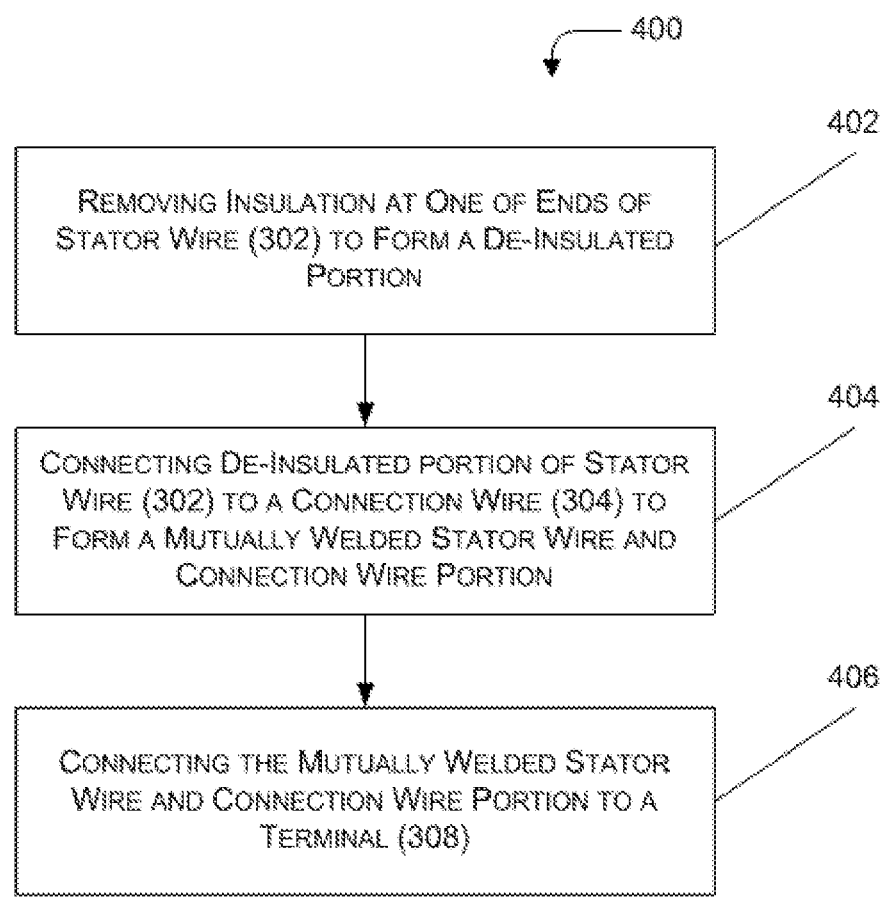
FIG. 4 illustrates a flow chart of a method of connecting a stator wire of the rotary electromagnetic device to the terminal connection region, in accordance with an implementation of the present subject matter.

FIG. 4 illustrates an exemplary method 400 for connecting the terminal 308 to the rotary electromagnetic device 100, according to an implementation of the present subject matter. The order in which the method is described is not intended to be construed as a limitation, and any number of the described method blocks may be combined in any order to implement the aforementioned methods, or an alternative method.

As illustrated in FIG. 4, at block 402, the insulation at one of the ends of the stator wire 302 is removed. As explained previously, the stator wire 302 is insulated with a coating of electrically non-conductive material like resin, Polyvinyl chloride and Polytetrafluoroethylene. The insulation coating may be removed by any of the conventionally known methods. In an example, the insulation coating is removed by scraping off the insulation to produce a de-insulated portion of the stator wire 302. The insulation coating may be scraped off using any sharp edged tool.

At block 404, without changing stator configuration, the de-insulated portion of the stator wire 302 is connected to the connection wire 304. In an example, the connection wire 304 may be a small wire made of any electrically conducting material. In the present example, the connection wire 304 is a copper wire. Further, in the present example, the connection wire 304 made of copper is connected to the stator wire 302 made of aluminum by ultrasonic welding to form a mutually welded stator wire and connection wire portion 210.

At block 406, the mutually welded stator wire and connection wire portion 210 are finally connected to the terminal 308. In an example, the terminal 308 and the mutually welded stator wire and connection wire portion 210 are connected by soldering. However, the mutually welded stator wire and connection wire portion 210 may be connected to the terminal 308 by any other conventionally known method.

The formation of the mutually welded stator wire and connection wire portion 210 makes it possible to connect the terminal 308 to the stator wire 302 made of aluminum, since the terminal 308 is not connected directly to the stator wire 302 made of aluminum, but through a connection wire 304 made of copper.

As those of ordinary skilled in the art will appreciate, various features of the various examples disclosed and described with reference to the figures may be combined with one or more other features disclosed in one or more other drawings to develop alternative implementations that are not explicitly described herein. However, such alternative implementations involving combinations and modifications of the various features described herein are well within the scope of the present subject matter.

We claim:

1. A rotary electromagnetic device (100), comprising:
   a rotor;
   a stator core;
   a stator wire made of aluminum and wound on the stator core and wherein the stator wire is insulated; and
   a connection wire connected to the stator wire, wherein the connection wire is made of copper;
   wherein a mutually welded stator wire and connection wire portion is formed by connecting the connection wire to the stator wire by ultrasonic welding, and
   wherein the mutually welded stator wire and connection wire portion is to be connected to a terminal made of copper such that both the connection wire and the stator wire in the mutually welded stator wire and connection wire portion are connected to the terminal.

2. The rotary electromagnetic device as claimed in claim 1, wherein the mutually welded stator wire and connection wire portion is to be connected to the terminal through soldering.

3. The rotary electromagnetic device as claimed in claim 1, wherein the rotary electromagnetic device is one of an electrical generator and an electrical motor.

4. The rotary electromagnetic device as claimed in claim 1, wherein the stator wire is insulated with an electrical non-conductor coating comprising one of resin, polyvinylchloride and polytetrafluoroethylene.

5. The rotary electromagnetic device as claimed in claim 1, wherein the rotary electromagnetic device is an Alternating Current (AC) generator.

6. A method of connecting a terminal to a rotary electromagnetic device, comprising:
   removing insulation at one of ends of a stator wire to form a de-insulated portion of the stator wire, wherein the stator wire being wound on a stator core of the rotary electromagnetic device, and the stator wire being made of aluminum;
   forming a mutually welded stator wire and connection wire portion by connecting the de-insulated portion of the stator wire to a connection wire by ultrasonic welding, wherein the connection wire is made of copper; and
   connecting the mutually welded stator wire and connection wire portion to a terminal made of copper such that both the connection wire and the stator wire in the mutually welded stator wire and connection wire portion are connected to the terminal.

7. The method as claimed in claim 6, wherein the method is performed without changing configuration of a stator having the stator core.

8. The method as claimed in claim 6, wherein removing the insulation comprises scrapping the insulation on the stator wire.

9. The method as claimed in claim 6, wherein connecting comprises connecting the mutually welded stator wire and connection wire portion to the terminal by soldering.

\* \* \* \* \*